(12) United States Patent
Scolnick (10) Patent No.: US 12,156,782 B1
(45) Date of Patent: Dec. 3, 2024

(54) ORIENTABLE DENTAL IMPLANT/POST DEVICE

(71) Applicant: Jeffrey A. Scolnick, New York, NY (US)

(72) Inventor: Jeffrey A. Scolnick, New York, NY (US)

( * ) Notice: Subject to any disclaimer, the term of this patent is extended or adjusted under 35 U.S.C. 154(b) by 0 days.

(21) Appl. No.: 18/614,663

(22) Filed: Mar. 23, 2024

Related U.S. Application Data (60) Provisional application No. 63/537,240, filed on Sep. 8, 2023.

(51) Int. Cl.
*A61C 8/00* (2006.01)

(52) U.S. Cl.
CPC .......... *A61C 8/0074* (2013.01); *A61C 8/0053* (2013.01); *A61C 8/0068* (2013.01)

(58) Field of Classification Search
CPC ... A61C 8/0074; A61C 8/0053; A61C 8/0068; A61C 8/005; A61C 8/0048
USPC .............................. 433/174–176, 201.1, 172
See application file for complete search history.

(56) References Cited

U.S. PATENT DOCUMENTS 4,907,969 A * 3/1990 Ward .................. A61C 8/0068
433/173

OTHER PUBLICATIONS

Wu, Kuan-Lin, Construction Of A One-piece Dental Implant With Adjustable Angle, DE-202020103011-U1, machine translation (Year: 2020).*

* cited by examiner

*Primary Examiner* — Ralph A Lewis
*Assistant Examiner* — Mirayda A Aponte
(74) *Attorney, Agent, or Firm* — Law Office of Carl Giordano, PC (57) ABSTRACT

Exemplary embodiments of an orientable dental device are discussed within the dental device includes a ball element that is positionable within a cup within a socket that is fixedly attached to a patient. The ball element includes a post that is orientable over a desired range (laterally and transversely and combination thereof) that allows for the incorporation of an artificial tooth (or teeth) to present a natural appearance.

8 Claims, 8 Drawing Sheets

ORIENTABLE DENTAL IMPLANT/POST DEVICE

CLAIM OF PRIORITY

This application claims, pursuant to 35 USC 119, priority to and the benefit of the earlier filing date of that Provisional patent application filed on Sep. 8, 2023 and afforded Ser. No. 65/537,240, the contents of which are incorporated by reference, herein.

BACKGROUND OF THE INVENTION

Field of the Invention

This invention relates to the field of dentistry and more particularly to a device suitable for stabilizing and retaining dental caps.

Background Information

Dental care has become increasingly important as medical science has traced many types of infections to the health of the gums and teeth within the oral cavity. Teeth replacement is of particularly importance since the failure to replace lost teeth alters the health of a person, in failing to eat certain foods, while causing changes within the jaw as the remaining teeth may shift to the areas of the lost teeth.

One method for providing improved dental health is tooth or teeth replacement for missing teeth, wherein an attachment device is inserted within a patient's jaw bone in a space created by the missing or extracted tooth. This attachment device operates as an anchor for the retention of an artificial tooth (or teeth) that will occupy the space. An abutment is attached to the attachment device, wherein the abutment operates as a point of contact for the placement of the artificial tooth (referred to as a crown). The crown then fills the space of the missing tooth (or teeth) to retain the remaining teeth in proper alignment.

Another method for providing improved dental health is by performing root canal therapy on a damaged tooth. Root canal therapy comprises the removal of the organic material within the diseased or damaged tooth. In this case, the original tooth remains within the patient's jawbone and a cap (i.e., artificial tooth) may be placed over the remaining original tooth.

However, the surface area of the remaining original tooth may not be sufficient to provide a suitable area to retain the cap in place. In this case, a dental post may be inserted within the vacated area within the root canal to allow for the retention of the cap when placed over the existing tooth. Alternatively, the dental post may operate as a surface wherein material is added to the existing tooth to form an artificial tooth.

However, in either case, conventional implants are fixed in their orientation and, thus, the practitioner is limited as to orientation of the attachment device, in the case of implants, or the dental post within the existing tooth.

Hence, there is a need in the industry for a device suitable for allowing the orientation of the implant or the post to accommodate alignment of the cap with the remaining teeth within the patient's mouth.

SUMMARY OF THE INVENTION

Disclosed is a dental device that may be inserted into a space formed by a root canal therapy that is suitable for retaining an artificial tooth (or cap) in place.

Disclosed is a dental device that may be inserted into a space formed by a root canal therapy that provides for the proper alignment of a cap with the surrounding teeth.

Disclosed is a dental device that provides for a variability with regard to its relation within a tooth that has been subjected to a root canal therapy.

Disclosed is a dental device that provides for the proper orientation of the placement of a cap upon a tooth that has undergone a root canal treatment.

Disclosed is an exemplary embodiment of a root canal treatment dental device in accordance with the principles of the invention.

Disclosed is a dental device that may be inserted into a space within a jaw bone of a patient suitable for retaining an artificial tooth (or cap) in place.

Disclosed is a dental device that may be inserted into a space within a jaw bone of a patient that provides for the proper alignment of a cap with the surrounding teeth.

Disclosed is a dental device that provides for a variability with regard to its relation within a row of tooth wherein one or more of the teeth have been removed from the jaw bone.

Disclosed is a dental device that provides for the proper orientation of the placement of a cap within a row of teeth, wherein one or more of the teeth have been removed from the jaw bone.

Disclosed is an exemplary embodiment of a dental device in accordance with the principles of the invention.

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure and are presented to clarify the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

The advantages, nature, and various additional features of the invention will appear more fully upon consideration of the illustrative embodiments described in detail in connection with the accompanying drawings, where like or similar reference numerals are used to identify like or similar elements throughout the drawings.

It is to be understood that the figures, which are not drawn to scale, and descriptions of the present invention described herein have been simplified to illustrate the elements that are relevant for a clear understanding of the present invention, while eliminating, for purposes of clarity, many other elements. However, because these omitted elements are well-known in the art, and because they do not facilitate a better understanding of the present invention, a discussion of such elements are not provided herein. The disclosure, herein, is directed also to variations and modifications known to those skilled in the art.

DETAILED DESCRIPTION OF THE INVENTION

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description, herein, should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one skill in the art would consider equivalent to the recited value (i.e., having the same function or result). In any instance, the terms "about" may include numbers that are rounded (or lowered) to the nearest significant figure.

Figure 1A:
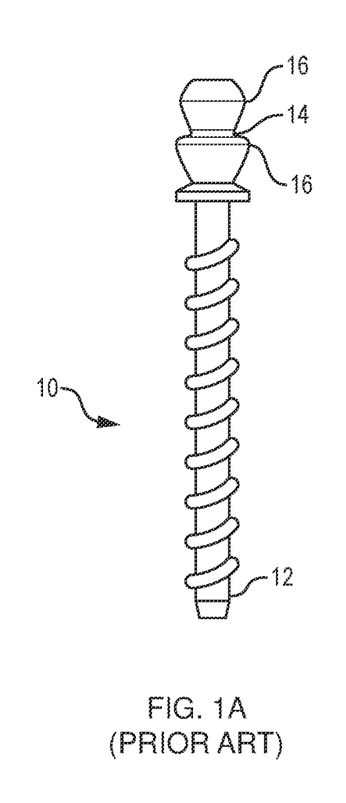
FIG. 1A illustrates a first aspect of a conventional dental post device.
Figure 1B:
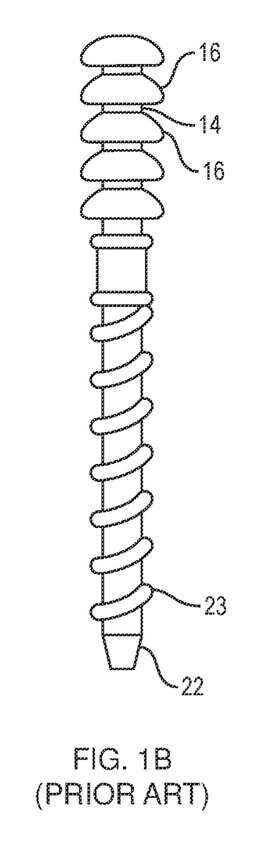
FIG. 1B illustrates a second aspect of a convention dental post device

FIGS. 1A and 1B illustrate conventional posts suitable for dental usage.

FIG. 1A illustrates a first embodiment of a conventional dental post 10 comprising a tail section 12 and a head section 14, wherein the tail section 12 may be inserted within space formed by the removal of organic material within an existing tooth or a space within a row of teeth. Tail section 12 may be retained within the space by a dental adhesive, for example. Head section 14 comprises a series of ridges 16, which are used to provide an increased surface area onto which material may be added to reconstruct an existing tooth. Alternatively, ridges 16 may be used to provide for, and increase the surface area onto which a material and/or a cap (i.e., artificial tooth) may be placed.

FIG. 1B illustrates a second embodiment of a conventional dental post 20 wherein tail section 22 comprises a screw thread 23 that may allow for the retention of post 20 within the space formed by the removal of organic material within an existing tooth. Screw thread 23 may be used to "screw" post 20 into the tooth root canal of an existing tooth or into a jaw bone of a patient.

Figure 2:
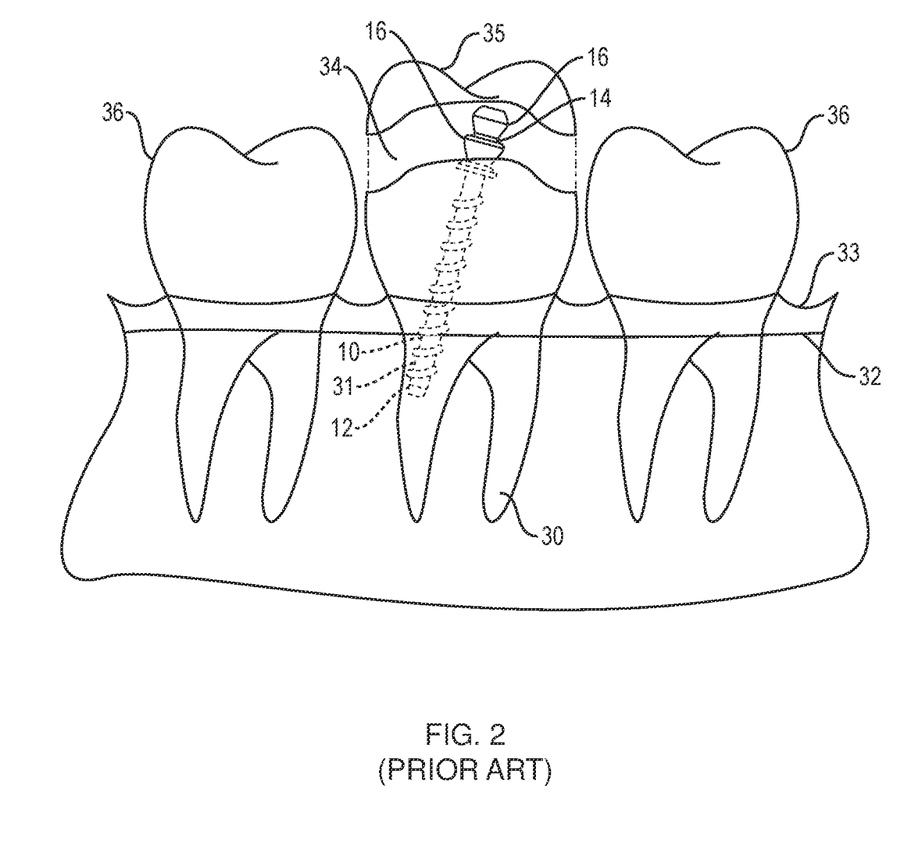
FIG. 2 illustrates a side view of a conventional root-canal dental post installation.

FIG. 2 illustrates a side view of a conventional root canal dental post installation.

In this illustrated example, tail or post 10 (or 20), including tail section 12 (or 22) and head section 14 (or 24), is retained within a space 31 formed within tooth 30 positioned within a jaw bone 32 and gum 33 of a patient's mouth, wherein the tooth 30 has been subjected to root canal therapy (i.e., removal of material from at least one of the root canal within tooth 30). Further illustrated is material 34, which has been formed around head section 14. Material 34 provides additional surface area in the reconstruction of tooth 30 and covered with cap 35 that substantially matches the surrounding teeth 36. As shown post 10 (or post 20) is angularly positioned within tooth 30 so as to conform to the orientation of the root system within tooth 30.

Figure 3:
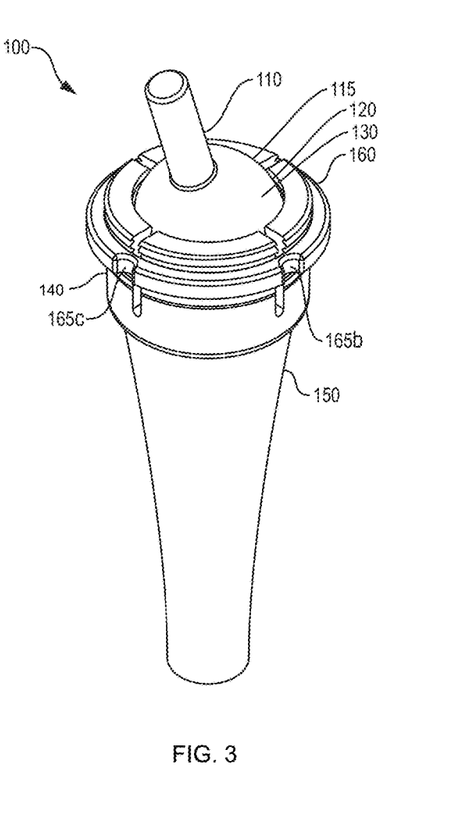
FIG. 3 illustrates a front view of a first exemplary embodiment of an orientable dental device in accordance with the principles of the invention.

FIG. 3 illustrates a prospective view of a first exemplary embodiment of an orientable dental device in accordance with the principles of the invention.

In this illustrated view, dental device 100 comprises a first section (i.e., a head) comprising an extending upward or ascending stem element 110 and a ball element 115, and a second section (i.e., tail) comprising a socket element 140, forming cup 120, therein on a proximal end of said tail and a descending (or downward) oriented post 150. Post 150, which when inserted into a jaw bone or a tooth root canal provides an anchor for the retention of device 100 within the space within the jaw bone formed by an extracted tooth or in the canal from which the nerve (i.e., root) has been extracted.

Further illustrated is ring 160 encircling socket 140. Ring 160 comprises indents or indentures or contact points 165*a*

(not shown), 165*b*, 165*c*. Indents 165*a*, 165*b*, 165*c* provide points to control the positioning of ring 160 with respect to socket 140.

As shown, upward oriented stem 110 is positionable (or orientable) with respect to descending post 150 by the movement 130 of ball element 115 within cup 120. In accordance with the principles of the invention stem 100 may be, through movement 130 (e.g., back, forth, left, right and combinations thereof), positioned in a plurality of orientations with respect to post 150.

Figure 4:
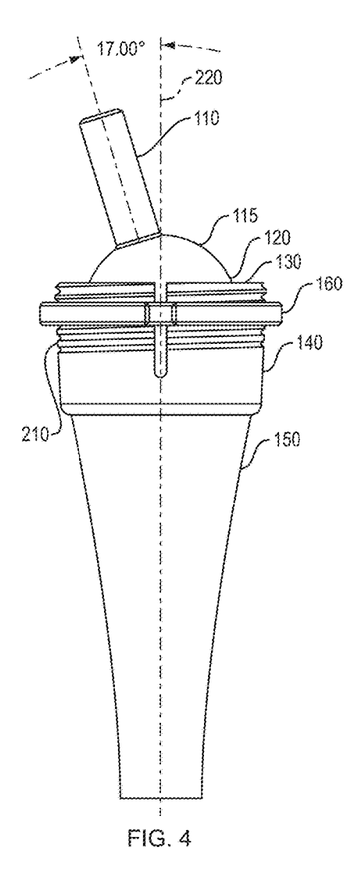
FIG. 4 illustrates a side view of the first exemplary embodiment of the orientable dental device shown in FIG. 3.

FIG. 4 illustrates a side view of the first exemplary embodiment of the orientable dental device shown in FIG. 3.

in this illustrated aspect, tread 210 is shown positioned along an outer circumference of socket 140. Further illustrated is ring 160 positioned on tread 210, wherein ring 160 is rotatably positionable about tread 210. In one aspect of the invention, the outer circumference of socket 140 may be taped, wherein as ring 160 is rotated on tread 210, socket 140 tightens cup 120 around ball 115 to lock ball 115 (and stem 110) in a fixed position.

In the illustrated exemplary configuration, stem 110 is shown positioned (or oriented) at a known angle (e.g., 17 degrees) from an axis 220 extending through post 150.

Although the illustrated embodiment of the invention shown refers to a 17-degree offset orientation of stem 110 with respect to axis 220, it would be understood by those skilled in the art, that stem 110 may, through the movement 130 of ball 115, be set at a plurality of different angles with respect to axis 220, wherein the angles may be in the plane of the page showing the illustrated configuration or perpendicular to the plane of the page showing the illustrated configuration, or combinations of angle in the plane and perpendicular to the plane of the page showing the illustrated configuration without altering the scope of the invention claimed.

Figure 5:
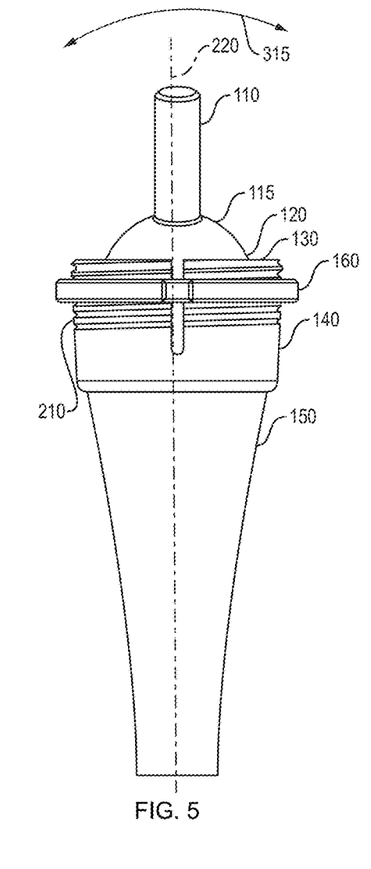
FIG. 5 illustrates a perspective view of the first exemplary embodiment of the orientable dental device shown in FIG. 3.

FIG. 5 illustrates a front view of the first exemplary embodiment of the orientable dental device shown in FIG. 3.

Similar to FIG. 4, FIG. 5 illustrates the orientation of stem 110 with respect to axis 220. In this case, stem 110 is shown substantially in-line with axis 220. Although stem 110 is shown substantially in-line with axis 220, it would be recognized that stem 110 may be moved left or right (with respect to image shown in FIG. 3) 315 to orient stem 110 with respect to axis 220. Hence, by the movement of stem 110 in a two-dimensional plane, stem 110 may be positioned at a complex angle (i.e., a combination of an angle in the plane of the page showing the illustrated configuration and perpendicular to the plane of the page showing the illustrated configuration) with respect to post 150.

Figure 6:
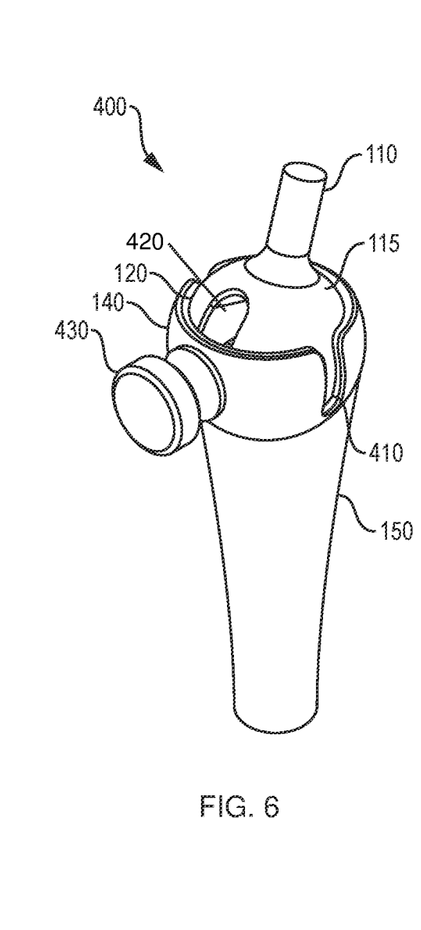
FIG. 6 illustrates a perspective view of a second exemplary embodiment of an orientable dental device in accordance with the principles of the invention.

FIG. 6 illustrates a perspective view of the second exemplary embodiment of an orientable dental device in accordance with the principles of the invention.

Second embodiment of dental device comprises an orientable stem 110, a ball element 115, socket 140 forming a cup 120, therein and a downward post 150 similar to those elements described with regard to FIG. 3.

Further illustrated is screw element 430 extending through from a first side of socket 140 to a second side of said socket 140, wherein retainer element (e.g., a screw) 430 operates to compress slot 410 to retain stem 110 at a desired orientation with respect to post 150 (i.e., axis 220). In this illustrated view, stem 110 is shown offset from axis 220.

Further illustrated is socket slot 410 within socket 140 and ball slot 420 within ball 115, wherein ball slot 420 is offset from socket slot 410. In this illustrated example, ball slot 420 is substantially perpendicular to socket slot 410 and to retainer 430. Slot 410 allows for the compression of socket 140 (and cup 120) to fix or retain ball element 115 (and stem 110) at a desired orientation. Slot 420, within ball element 115, allows for the passage of screw 430 through ball 115 to an opposing side 440 of socket 140.

Figure 7:
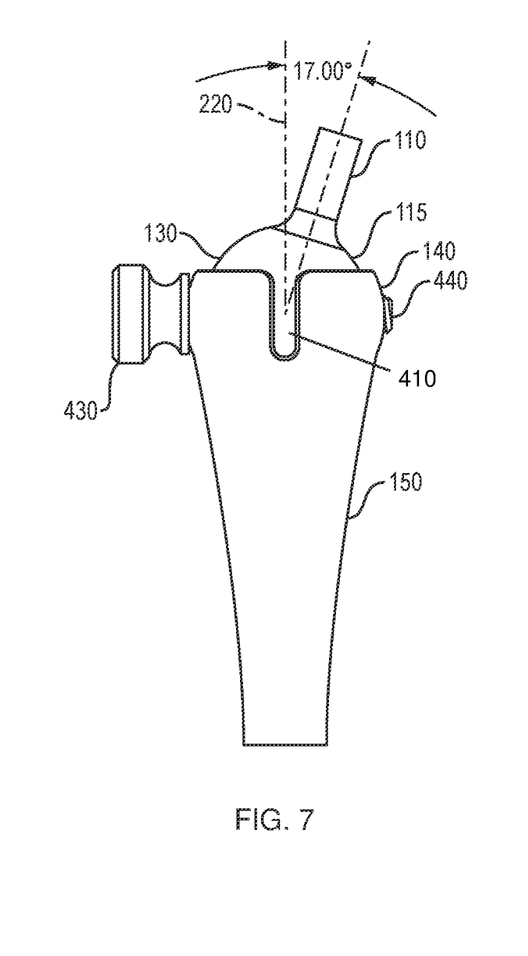
FIG. 7 illustrates a side view of the second exemplary embodiment of the orientable dental device shown in FIG. 6.

FIG. 7 illustrates a side view of the second exemplary embodiment of an orientable dental device shown in FIG. 6.

In this illustrated side view of the second exemplary embodiment of the dental device 400, stem 115 is shown oriented at a known angle (e.g., 17 degrees) offset from axis 220. As discussed previously, although an exemplary angle of 17 degree is shown, it would be recognized that with the movement of ball 115 left or right (315) within cup 120, the angle of stem 115 may be altered to any complex angle with respect to axis 220 without altering the scope of the scope of the invention claimed.

Figure 8:
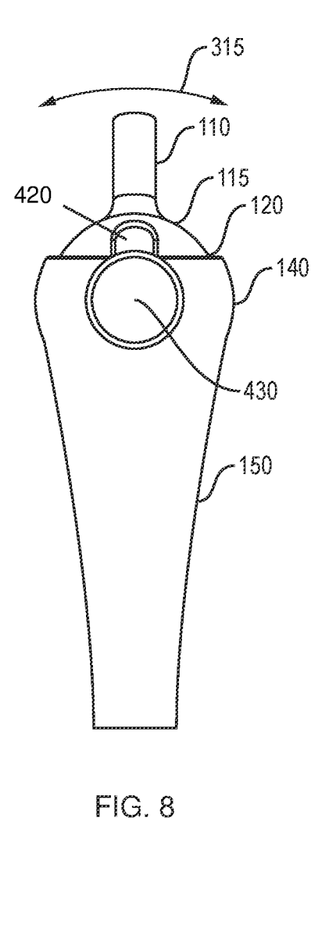
FIG. 8 illustrates a front view of the second exemplary embodiment of the orientable dental device shown in FIG. 6.

FIG. 8 illustrates a front view of the second exemplary embodiment of the dental device shown in FIG. 6.

In this illustrated aspect of the invention, stem 110 is shown substantially in-line with axis 220, in a manner similar to that discussed with regard to FIG. 3. However, it would be recognized that movement 130 of ball 115 allows for the orientation of ball 115 in a plurality of orientations (left and right, back (into the plane of the page of the drawing) and forth (extending off the range of page of the drawing).

Figure 9:
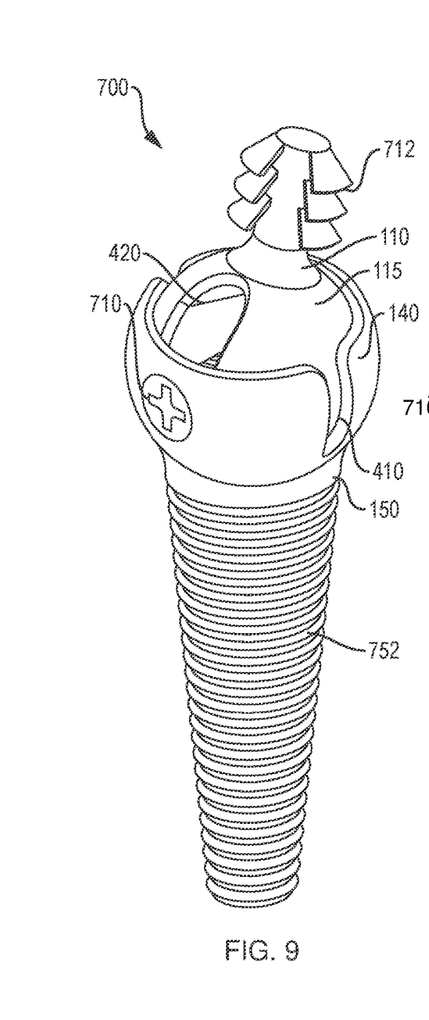
FIG. 9 illustrates a perspective view of a third exemplary embodiment of an orientable dental device in accordance with the principles of the invention.

FIG. 9 illustrates a perspective view of a third exemplary embodiment of a dental device in accordance with the principles of the invention.

Similar to the exemplary embodiment shown in FIG. 6, this third exemplary embodiment of a dental device 700 comprises a stem 110 and ball element 115 inserted within cup 120 formed within socket 140, as previously discussed. In addition, an attachment configuration 712 is incorporated onto stem 110. In one aspect of the invention, attachment configuration may comprise at least one ridge, corrugation, parapet or spine onto which artificial tooth may be placed. Attachment configuration 712 provides additional surface area for the retention of an artificial tooth (i.e., a cap) onto dental device 700, in a manner similar to that discussed with regard to FIGS. 1A and 1B. Attachment configuration 712 may be integral to (as shown) or incorporated onto stem 110. Although attachment configuration 712 is shown as a "Christmas tree" configuration, it would be recognized that attachment configuration 712 may comprise other forms that provide for increased surface area onto which an artificial tooth or cap may be attached. See for example, ridges 16 of FIGS. 1A and 1B.

Further illustrated is screw thread 752 incorporated into post 150. Screw thread 752 allows for the attachment of dental device 700 within a jaw bone or area within a tooth to which its organic material has been removed (i.e., root canal therapy).

For example, screw thread 752 may be used to contact a matching screw thread within a socket (not shown) that has been previously inserted within a patient's jaw bone. Alternatively, screw thread 752 may be used to attach dental device 700 directly to a patient's jaw. In still a further alternative aspect, screw thread 752 may allow for the insertion and retention of device 700 within the space formed by root canal therapy.

Figure 10:
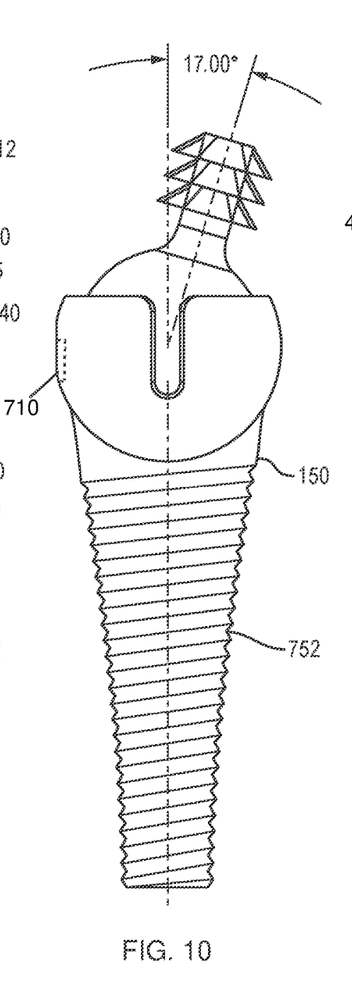
FIG. 10 illustrates a side view of the third exemplary embodiment of the orientable dental device shown in FIG. 9.

FIG. 10 illustrates a side view of the third exemplary embodiment of a dental device shown in FIG. 9.

Similar to the discussion made with regard to FIG. 8, the orientation of stem 110 may be altered by the movement of ball 115 within cup 120. Again, and as previously discussed, the illustrated orientation is seventeen (17°) degrees offset from the axis 220 passing though post 150. However, as would be recognized the orientation of stem 110 may be altered from the illustrated orientation by movement of ball 115, as previously discussed.

Further illustrated is slot 410 within socket 140, which allows for the compression of socket 140 (and cup 120) to retain ball 115 (and stem 110) in a desired orientation.

Figures 11, 12:
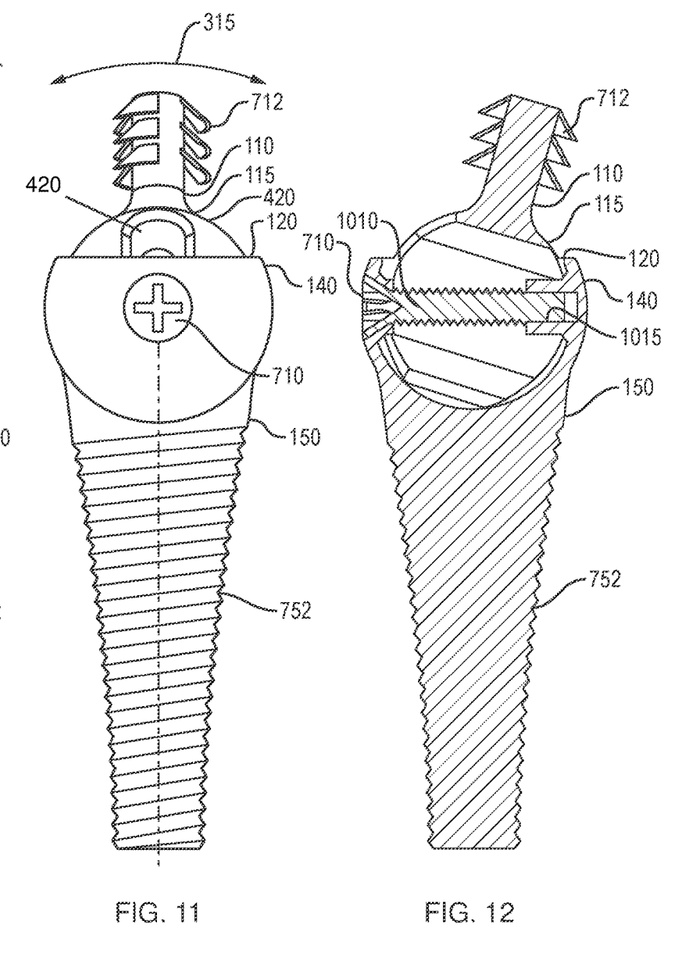
FIG. 11 illustrates a front view of the third exemplary embodiment of the orientable dental device shown in FIG. 9.
FIG. 12 illustrates a cut-away side view of the orientable dental device shown in FIG. 9.

FIG. 11 illustrates a front view of the third exemplary embodiment of a dental device in accordance with the principles of the invention.

In this illustrated view, screw 710 is shown positioned within socket 140, which eliminates any external projection of screw 710 from socket 140. In this illustrate example, screw 712 includes a "Philips" type screw head. However, it would be understood that the screw head of screw 712 may be altered without altering the scope of the invention claimed. For example, screw head of screw 712 may comprise a slotted head, an Allen key head (e.g., hexagonal or octagonal) or a Trox screw head.

Further illustrated is slot 420 within ball 115. Slot 420 allows for the passage of screw 712 through ball 115. Slot 420 provides for an angular movement of ball 115 within cup 120. In one aspect of the invention, slot 420 may be sized, within ball 115, to limit the angular motion or movement of ball 115 to be no more than a desired number of degrees. In one aspect of the invention, ball slot 420 may be sized to limit the angular movement of ball 115 to twenty (20) degrees, for example. Although an angular movement limitations of twenty degrees is discussed, it would be known to those skilled in the art to size ball slot 420 to limit movement of ball 115 to a different angular movement, without altering the scope of the invention claimed.

FIG. 12 illustrates a cut-away view of the side view shown in FIG. 10.

In this illustrated aspect embedded screw 710 comprising stem 1010, is shown passing through ball 115, and engaging capture cavity 1015. As screw 712 is turned, a force is applied to socket 140 that causes a compression of socket 140, which causes the retention of ball 115 in a desired position.

Figure 13:
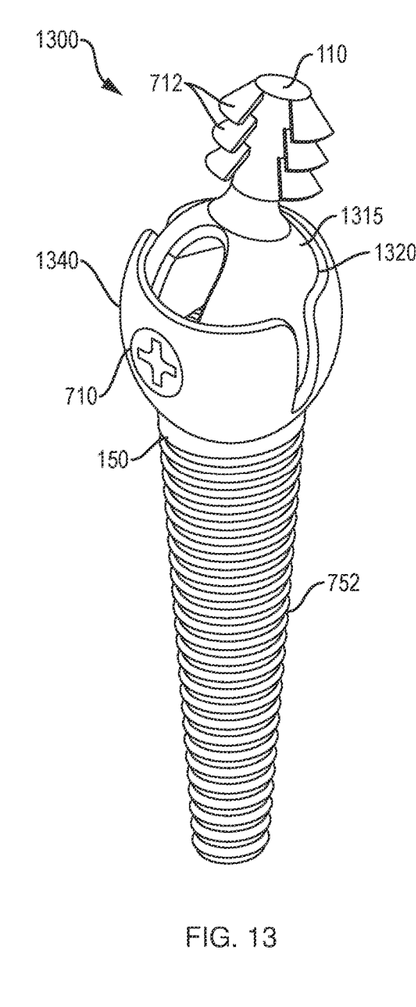
FIG. 13 illustrates a perspective view of a fourth exemplary embodiment of an orientable dental device in accordance with the principles of the invention.

FIG. 13 illustrates a perspective view of a fourth exemplary embodiment of a dental device in accordance with the principles of the invention.

Similar to the configuration shown in FIG. 7, this fourth exemplary embodiment of a dental device 1300 comprises a post 150, including optional tread 752, a cup 1320. However, FIG. 13 illustrates socket 1340 is in the form of an elongated or elliptical cup as opposed to the spherical cup previously discussed and illustrated (See FIG. 9, for example). Further illustrated is ball element 1315, which is also in an elongated ball shape and stem 110 including attachment 712. This illustrated embodiment, attachment 712 is shown in a form similar to the ridges 16 of FIG. 1A.

Figure 14:
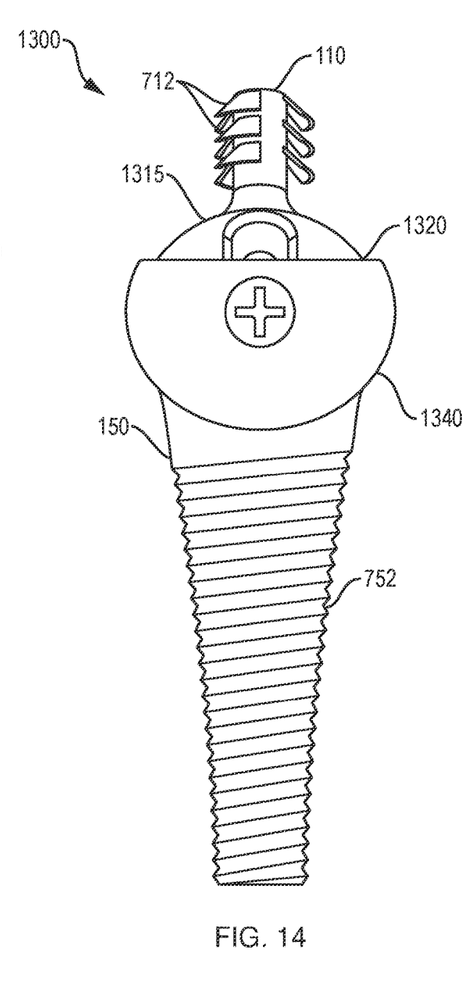
FIG. 14 illustrates a front view of the fourth exemplary embodiment of the dental device shown in FIG. 13.

FIG. 14 illustrates a front view of the fourth exemplary embodiment of the dental device shown in FIG. 13.

In this exemplary embodiment, socket 1340 is shown in an elongated or elliptical form wherein ball element 1315 is movable within the cup 1320 formed within socket 1340.

Figure 15:
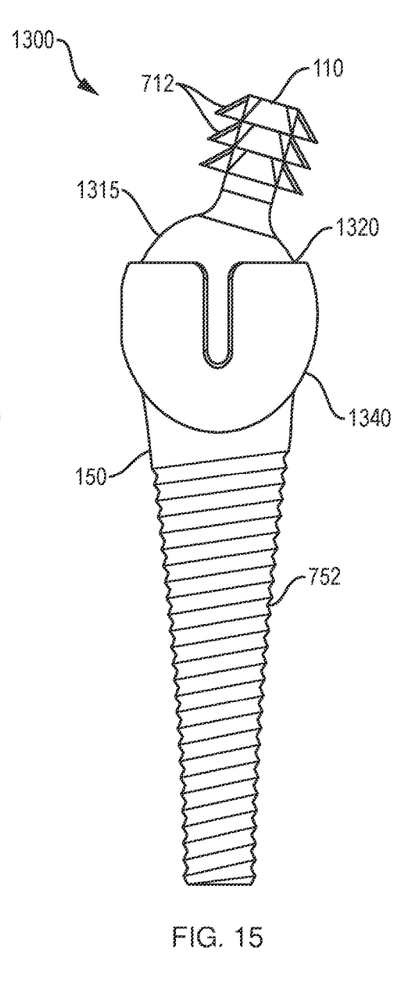
FIG. 15 illustrates a side view of the fourth exemplary embodiment of a dental device shown in FIG. 13.

FIG. 15 illustrates a side view of the fourth exemplary embodiment of a dental device shown in FIG. 13.

In this illustrated view, the elongated or elliptical shape of socket 1340 is more clearly shown wherein the width of socket 1340 is less than the length of socket, shown in FIG. 14.

In accordance with this embodiment of the invention, movement of ball 1315 in a lateral direction (FIG. 14) is greater than movement of ball 1315 in a transverse direction (FIG. 15).

Figure 16:
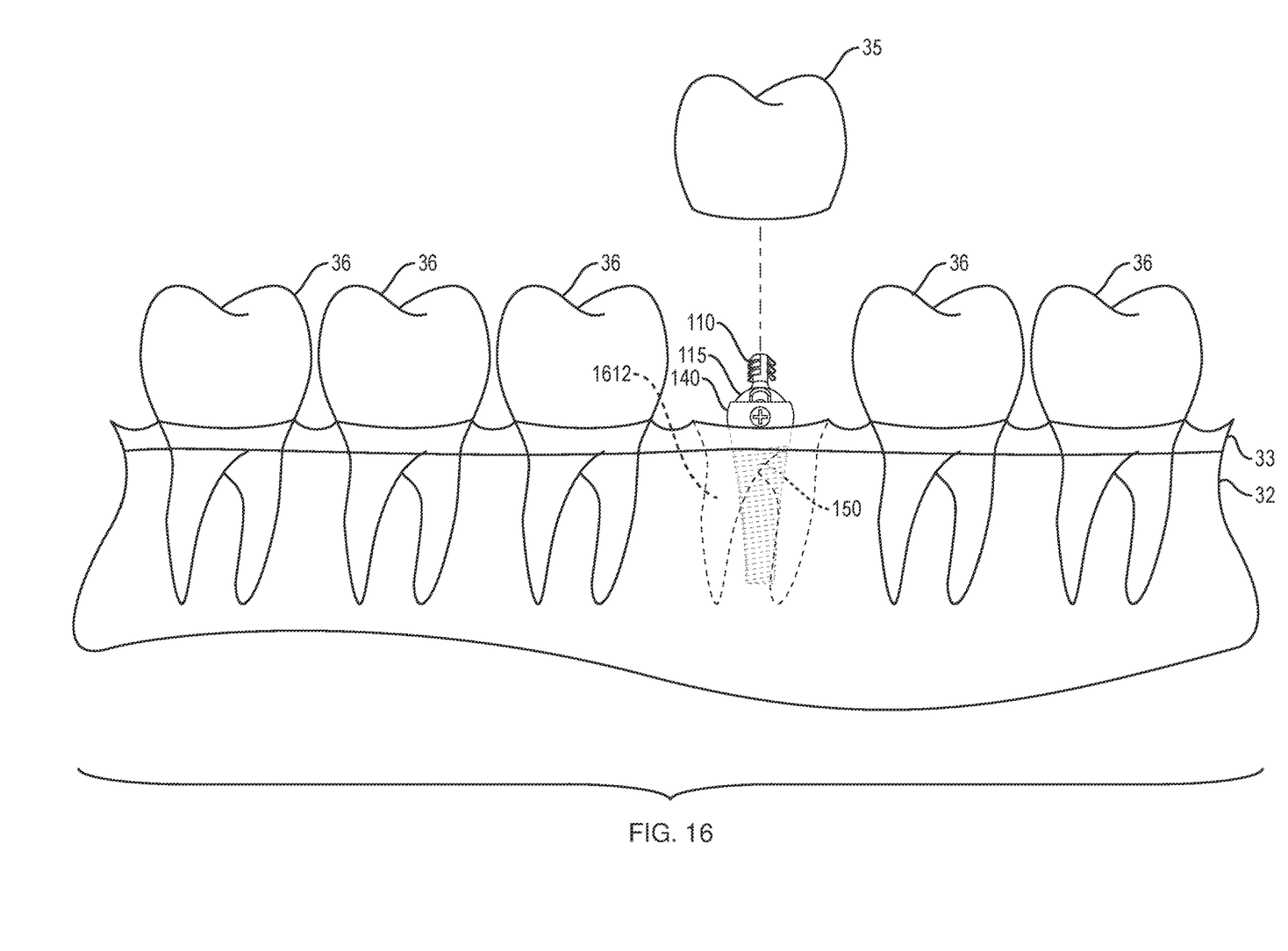
FIG. 16 illustrates an exemplary application, as a dental implant, of the embodiments of the dental device shown and discussed herein.

FIG. 16 illustrates an exemplary application of the embodiments of a dental device shown and discussed, herein.

In this illustrated application, where dental device 100 (400, 700, 1300) operates as a dental implant, dental device 100 (400, 700, 1300) may be inserted and anchored into jaw bone 32 within a space 1612 formed within a row of teeth 36 by the extract of one or more of teeth 36 from jawbone 32. Post 150 may be directly set within jaw bone 32 or may be inserted within a sleeve (not shown) that had previously been inserted within jaw bone 32. In one aspect of the invention, post 150 may be cemented within jaw bone 32. In an alternative aspect of the invention, post 150 may be "screwed" into the, not shown, sleeve previously inserted into jaw bone 32.

In accordance with the principles of the invention, stem 110 may be aligned with teeth 36 by the movement (315) of ball 115 to allow artificial tooth or cap 35 to be correctly positioned with respect to teeth 36. As discussed previously, stem 110 may be oriented laterally with, or traversal to, (and combinations thereof) the direction of the row of teeth 36 to allow for the positioning of cap 35 with respect to teeth 36.

Figure 17:
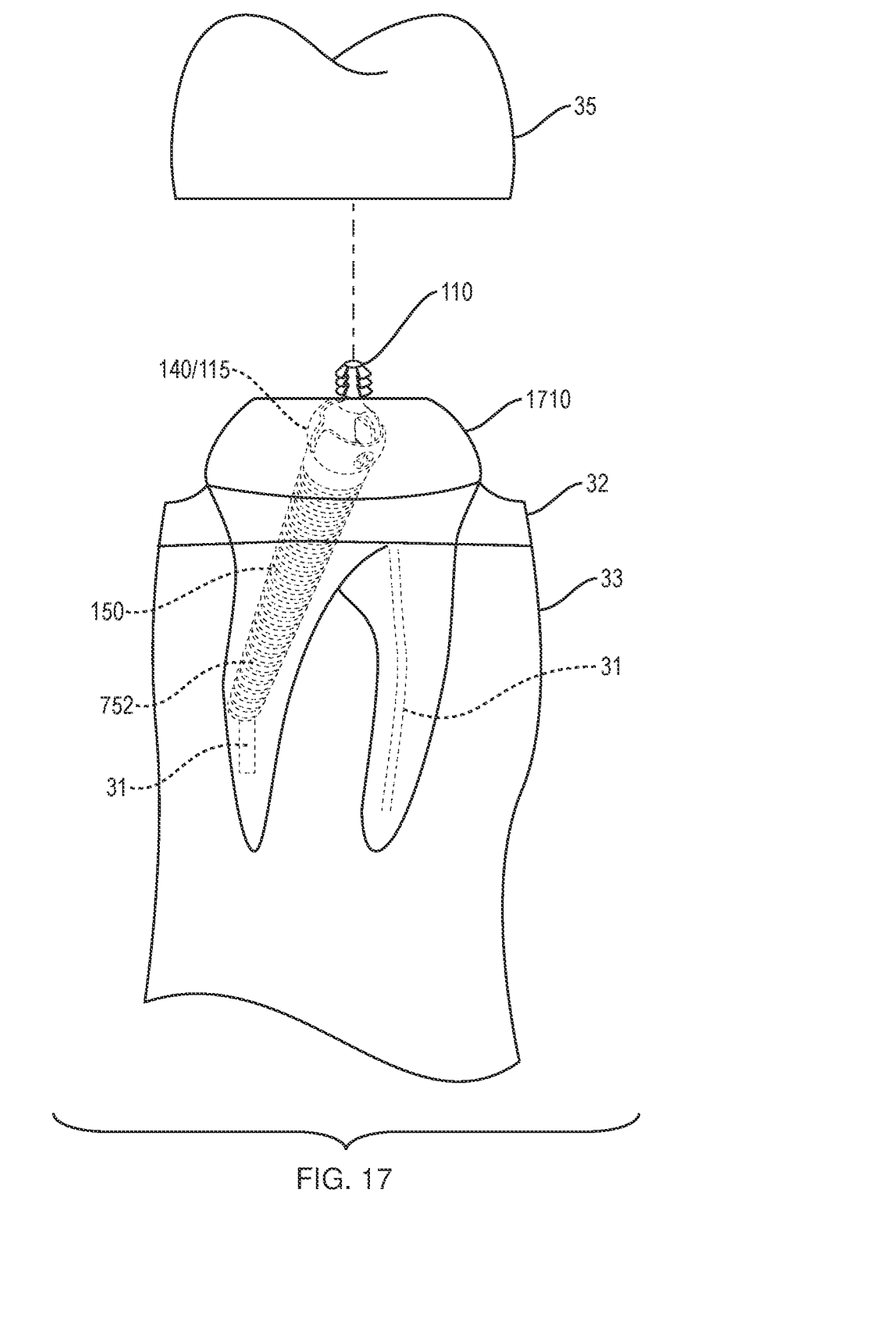
FIG. 17 illustrates a second exemplary application, as a dental root canal post of the embodiments of a dental device shown and discussed, herein.

FIG. 17 illustrates a second exemplary application of the dental devices shown herein.

In this illustrated application, wherein dental device 100 (400, 700, 1300) operates a dental implant post, dental device 100 (400, 700, 1300) is shown positioned and anchored (i.e., implanted) within a region (e.g., a canal within which a root of said tooth exists) from which organic material (i.e., a root canal) has been removed. In this illustrated application, stem 110 is arranged in a substantially vertical position, and offset from the orientation of post 150 within canal 31, to allow for the attachment of cap 35 onto the remaining portion 1710 of tooth 36.

In summary, exemplary embodiments of an orientable dental device are discussed within the dental device includes a ball element that is positionable within a cup within a socket that is fixedly attached to a patient. The ball element includes a post that is orientable over a desired range (laterally and transversely and combination thereof) that allows for the incorporation of an artificial tooth (or teeth) to present a natural appearance.

The invention has been described with reference to specific embodiments. One of ordinary skills in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above regarding specific embodiments. The benefits, advantages, and solutions to problems, and any element(s) that may cause any benefits, advantages, or solutions to occur or become more pronounced, are not to be construed as a critical, required, or an essential feature or element of any or all of the claims.

What is claimed is:
1. A dental implant device, said device comprising:
  a tail section comprising:
    a socket element contained on a proximal end of said tail section, the socket element including a plurality of vertically oriented socket slots extending along an outer surface of the socket element;
a post extending toward a distal end of said tail section; and
a retainer, laterally displaced from the vertically oriented socket slots, extending through said socket element; and
a head section comprising:
a ball element positionable within said socket element, said ball element comprising:
a plurality of vertically oriented ball slots extending from a distal end of said ball element, wherein said retainer is positioned through said plurality of vertically oriented ball slots;
a stem extending vertically from said ball element, and
an attachment element, wherein said attachment element is integrally retained to said stem.

2. The dental implant device of claim 1, wherein said post element comprises:
a screw thread.

3. The dental implant device of claim 1, said socket is spherical and the ball element is spherical.

4. The dental implant device of claim 1, wherein said ball element is elliptical and the socket is elliptical.

5. The dental implant device of claim 1, wherein said plurality of vertically oriented ball slots are sized based on a desired maximum angular movement of said stem with respect to said post.

6. The dental implant device of claim 1, wherein said stem is movable with respect to said socket.

7. The dental implant device of claim 6, wherein said movement of said stem within said socket is within a range of −17 degrees to +17 degrees with respect to a vertical axis.

8. A dental implant device suitable for insertion into a jaw, said device comprising:
a head section comprising:
a ball comprising:
a first vertically oriented ball slot; and
a second vertically oriented ball slot, wherein said first vertically oriented ball slot and said second vertically oriented ball slot are on opposite surfaces of said ball; and
a stem extending vertically from said ball, said stem comprising:
an attachment element comprising:
at least one ridge; and
a tail section comprising:
a socket comprising:
a first vertically oriented socket slot; and
a second vertically oriented socket slot, wherein said first vertically oriented socket slot and the second vertically oriented socket slot are positioned, along an outer surface of the socket, perpendicular to said first vertically oriented ball slot and second vertically oriented ball slot;
a post extending from said socket;
said post comprising a screw thread; and
a retainer laterally positioned with respect to the first vertically oriented socket slot and the vertically oriented second socket slot, the retainer extending from a first side of said socket to a second side of said socket through said first vertically oriented ball slot and said second vertically oriented ball slot, the retainer configured to:
squeeze both the first vertically oriented socket slot and the second vertically oriented socket slot to reduce a size of the first and the second socket slots.

* * * * *